(12) United States Patent
Rehfuss et al.

(10) Patent No.: US 11,445,852 B2
(45) Date of Patent: Sep. 20, 2022

(54) BEVERAGE SYSTEM HAVING A CONVEYING CARRIAGE FOR A CAPSULE

(71) Applicant: BSH Hausgeraete GmbH, Munich (DE)

(72) Inventors: Evgeni Rehfuss, Munich (DE); Tim Glaesser, Mainz (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 17/607,504

(22) PCT Filed: Apr. 22, 2020

(86) PCT No.: PCT/EP2020/061197
§ 371 (c)(1),
(2) Date: Oct. 29, 2021

(87) PCT Pub. No.: WO2020/221637
PCT Pub. Date: Nov. 5, 2020

(65) Prior Publication Data
US 2022/0142394 A1     May 12, 2022

(30) Foreign Application Priority Data
Apr. 29, 2019   (DE) .......................... 102019206100.1

(51) Int. Cl.
*A47J 31/40*    (2006.01)
*A47J 31/36*    (2006.01)

(52) U.S. Cl.
CPC .......... *A47J 31/407* (2013.01); *A47J 31/3604* (2013.01); *A47J 31/3623* (2013.01); *A47J 31/3633* (2013.01); *A47J 31/3666* (2013.01)

(58) Field of Classification Search
CPC .. A47J 31/407; A47J 31/3604; A47J 31/3623; A47J 31/3633; A47J 31/3666
See application file for complete search history.

(56) References Cited

U.S. PATENT DOCUMENTS 8,069,886 B1 *  12/2011  Yanke .................... G21F 5/018
                                                   141/370
2008/0121111 A1   5/2008  Paget et al.
(Continued)

FOREIGN PATENT DOCUMENTS

DE    102016210033 A1    12/2017
DE    102016218633 A1    3/2018

*Primary Examiner* — Dana Ross
*Assistant Examiner* — Kuangyue Chen
(74) *Attorney, Agent, or Firm* — Laurence A. Greenberg; Werner H. Stemer; Ralph E. Locher

(57) ABSTRACT

A beverage system for making a beverage based on ingredients in a capsule has a conveying carriage with a capsule carrier, a threaded spindle extending inside a housing of the beverage system and having a drive nut connected to the capsule carrier. A stop element is arranged on the threaded spindle at an ejection position for blocking movement of the drive nut along the threaded spindle. A motor rotates the threaded spindle in a first direction of rotation, in order to move the capsule carrier to a processing position, where a beverage is made based on the ingredients in a capsule; in order to move the capsule carrier further along the threaded spindle to an ejection position; and in order to rotate the capsule carrier at the ejection position about the threaded spindle to eject the capsule from the capsule carrier.

18 Claims, 10 Drawing Sheets

(56) References Cited

U.S. PATENT DOCUMENTS

| | | | |
|---|---|---|---|
| 2017/0143907 A1* | 5/2017 | Stever | A61M 5/20 |
| 2017/0251862 A1* | 9/2017 | Bolognese | A47J 31/3628 |
| 2019/0290049 A1 | 9/2019 | Jantschke et al. | |

* cited by examiner

BEVERAGE SYSTEM HAVING A CONVEYING CARRIAGE FOR A CAPSULE

FIELD AND BACKGROUND OF THE INVENTION

The invention relates to a beverage system for making a beverage based on ingredients in a capsule. The invention relates, in particular, to the processing of a capsule within a beverage system.

In a capsule-based beverage system the ingredients in a capsule placed into the beverage system may be mixed with at least one further liquid (for example water) in order to provide a portion of a beverage.

The present document relates to the technical object of providing a cost-efficient beverage system by which it is possible to make mixed beverages based on ingredients in a capsule in a safe and convenient manner.

SUMMARY OF THE INVENTION

The object is achieved by the subject matter of the independent claim. Advantageous embodiments are defined, in particular, in the dependent claims, described in the following description or shown in the accompanying drawing.

According to one aspect of the invention, a beverage system for making a beverage, in particular a mixed beverage, based on ingredients in a capsule is described. In this case, in particular, a capsule which comprises ingredients for exactly one portion (for example for one glass) of an (alcoholic or non-alcoholic) beverage may be processed by the beverage system. A portion of a beverage may be made by the beverage system from the ingredients (in particular from substantially all of the ingredients) in a capsule.

The beverage system typically comprises a housing which at least partially encloses an interior of the beverage system. For example, the housing may be cuboidal with four side walls, a bottom and a top wall. The beverage system may be configured, for example, as a domestic appliance, in particular as a household appliance, which may be placed for example on a worktop of a kitchen and/or may be built into a built-in cabinet.

The beverage system may be designed to receive a capsule described in this document. The beverage system comprises a capsule carrier for receiving a capsule. Moreover, the beverage system may comprise a dispensing unit for providing a beverage which is made based on ingredients in the capsule. Moreover, the beverage system typically comprises an opening means which is designed to open the one or more outlet openings of the capsule received by the capsule carrier, so that ingredients on the lower face of the capsule may flow out of the channel-shaped cavity of the capsule to the dispensing unit. In this case, the capsule and in particular the channel-shaped cavity of the capsule may be arranged directly above the dispensing unit so that the ingredients from the capsule and/or liquids from the beverage system may flow directly from the channel-shaped cavity to the dispensing unit (for example into a cup or into a glass on the dispensing unit).

The beverage system comprises a conveying carriage having the capsule carrier for receiving a capsule. In this case the capsule carrier may be releasably connected (via one or more releasable couplings, for example via one or more magnetic and/or spring-loaded couplings) to the conveying carriage. The conveying carriage may be configured such that the conveying carriage may be moved on a housing wall (for example on a housing front) of the housing of the beverage system together with the capsule carrier out of the housing of the beverage system or into the housing.

Moreover, the beverage system comprises a threaded spindle, extending inside the housing perpendicular to the housing wall and having a drive nut which is connected to the capsule carrier. The threaded spindle may be driven by an (electric) motor of the beverage system in order to move the drive nut and thereby the capsule carrier in a translatory movement along the threaded spindle.

The beverage system also comprises a stop element which is arranged on the threaded spindle at an ejection position and is designed to block movement of the drive nut along the threaded spindle. The stop element may be fixedly connected to the threaded spindle (and rotate together with the threaded spindle). Alternatively the stop element may be fixed separately from the threaded spindle at the ejection position.

The drive nut may be moved in a first direction along the threaded spindle (by a rotation of the threaded spindle in a first direction of rotation) in order to move the capsule carrier from a processing position toward the ejection position. The drive nut may also be moved in an opposing second direction along the threaded spindle (by a rotation of the threaded spindle in a second direction of rotation) in order to move the capsule carrier from the ejection position toward the processing position. The stop element may be configured to block the movement of the drive nut in the first direction at the ejection position.

The beverage system further comprises the motor which is designed to rotate the threaded spindle in the first direction of rotation or in the second direction of rotation. The motor may be activated by a control unit of the beverage system. For example, the control unit may cause the motor to drive the threaded spindle in order to move the capsule carrier into the processing position in order to make a beverage.

In particular, the motor may be designed (in response to a control by the control unit) to rotate the threaded spindle in the first direction of rotation in order to move the capsule carrier along the threaded spindle (out of an extended position) into the housing to the processing position. At the extended position, it may be possible for a user to insert a capsule into the capsule carrier. At the processing position, a beverage may be made based on the ingredients in the capsule placed in the capsule carrier.

Moreover, the motor may be designed (in response to a control by the control unit) to rotate the threaded spindle further in the first direction of rotation in order to move the capsule carrier further along the threaded spindle (from the processing position) to the ejection position, wherein at the ejection position the drive nut is pushed against the stop element. The motor is also designed (in response to a control by the control unit) to rotate the threaded spindle further in the first direction of rotation in order to push the drive nut against the stop element and in order to rotate the capsule carrier thereby at the ejection position about the threaded spindle. The rotation of the capsule carrier may cause the capsule to be ejected from the capsule carrier.

By the use of a single motor, the beverage system is thus configured to bring about both a translatory movement of the capsule carrier (for making a mixed beverage) and a rotational movement of the capsule carrier (for ejecting a capsule). Thus a cost-efficient beverage system may be provided for making a mixed beverage.

The conveying carriage may have a carriage front which is configured to close an opening in the housing wall for the conveying carriage and for the capsule carrier when the conveying carriage is located (optionally with the capsule carrier) at the processing position. The housing may be closed by the carriage front, therefore, when making a beverage. Thus a beverage may be made in a safe and reliable manner.

The conveying carriage may comprise at least two carrier rails which are configured to bear the capsule carrier. The carrier rails may run parallel to the threaded spindle. It is possible that the capsule carrier is deposited or, respectively, may be deposited on the at least two carrier rails in order to permit a reliable transport of the capsule carrier and the capsule received therein.

The conveying carriage may be releasably connected via one or more releasable couplings, in particular via one or more magnetic and/or spring-mounted couplings, to the capsule carrier. Thus, on the one hand, a reliable transport of the capsule carrier and the capsule received therein may be brought about. Moreover, it is thus possible in an efficient manner to rotate the capsule carrier about the threaded spindle in order to eject a (used) capsule out of the capsule carrier.

The beverage system may be configured such that the conveying carriage and the capsule carrier are moved together along the threaded spindle between the extended state (or, respectively, the extended position) of the conveying carriage and the processing position. Moreover, the beverage system may be configured such that the capsule carrier is moved along the threaded spindle without the conveying carriage between the processing position and the ejection position. To this end, the one or more releasable couplings may be released (by the force of the motor). The capsule carrier may then be displaced on the carrier rails of the (stationary) conveying carriage. Thus it is possible in an efficient manner to move the capsule carrier from the processing position (on which the housing opening is closed by the carriage front and from which the conveying carriage is stationary) into the ejection position for ejecting a used capsule.

The beverage system may comprise a torsion spring which is configured to push the capsule carrier onto the conveying carriage. The torsion spring may be arranged on the drive nut. In particular the torsion spring may enclose the threaded spindle. Moreover, the torsion spring may be configured to be entrained with the drive nut and/or the capsule carrier. The torsion spring makes it possible in an efficient and reliable manner that after ejecting a capsule the capsule carrier is placed back on the carrier rails of the conveying carriage.

The beverage system may comprise a support rail running along (and/or parallel to) the threaded spindle. The torsion spring may be configured to be supported on the support rail in order to push the capsule carrier onto the conveying carriage along the entire distance between the extended state (or, respectively, the extended position) of the conveying carriage and the ejection position. Thus a particularly reliable translatory movement of the capsule carrier and/or the conveying carriage may be brought about.

The motor may be configured to rotate the threaded spindle in the second direction of rotation (which is opposite the first direction of rotation) so that the capsule carrier is rotated back around the threaded spindle onto the conveying carriage. Moreover, the motor may be configured to rotate the threaded spindle in the second direction of rotation so that the capsule carrier is moved along the threaded spindle from the ejection position (back) to the processing position. The motor may also be configured to rotate the threaded spindle further in the second direction of rotation so that the capsule carrier and the conveying carriage are moved along the threaded spindle from the processing position further into the extended state (or, respectively into the extended position) of the conveying carriage out of the housing. Thus it may be brought about in a reliable manner that a new capsule is able to be introduced for making a further beverage.

The capsule carrier may be rotated from a first side of the threaded spindle to an opposing second side of the threaded spindle, in particular by an angle of between 160° and 200° for ejecting the capsule (at the ejection position). The beverage system may comprise a collection container for receiving an ejected capsule at the ejection position on the second side of the threaded spindle. The collection container may be configured to be removable. Thus a convenient operation of the beverage system may be permitted.

The capsule carrier may be releasably fastened by means of a first releasable coupling (for example a magnetic and/or spring-mounted coupling) to the carriage front of the conveying carriage. The first coupling may be configured in this case such that the first coupling is released when an object (for example a finger of a user) is trapped between the carriage front and the housing wall, whilst the capsule carrier is moved by the motor into the housing. By releasing the coupling, the force exerted by the motor on the conveying carriage is prevented. Thus a reliable anti-trapping protection may be provided for a user of the beverage system.

Alternatively or additionally, the capsule carrier may be fastened by means of a second coupling (directly or indirectly via a connecting piece) to the drive nut. Moreover, the capsule carrier may comprise a capsule receiver for receiving a capsule. The second coupling may be configured such that the second coupling is released when an object, which is located in the capsule receiver and which protrudes over the capsule receiver, is pushed against the housing wall, whilst the capsule carrier is moved by the motor into the housing. By releasing the coupling, the force exerted by the motor on the capsule carrier is stopped. Thus a reliable anti-trapping protection may be provided for a user of the beverage system.

Alternatively or additionally, the capsule carrier may be fastened by means of a third coupling (directly or indirectly via a connecting piece) to the drive nut. The third coupling may be configured such that the third coupling is released when the carriage front of the conveying carriage is pushed against an object, whilst the capsule carrier is moved with the conveying carriage by the motor out of the housing. By releasing the coupling, the force exerted by the motor on the conveying carriage is prevented. Thus a reliable anti-trapping protection may be provided for a user of the beverage system.

The capsule carrier may be connected via a connecting piece to the drive nut. In this case, the second coupling may be configured to connect the capsule carrier releasably to the connecting piece. Moreover, the third coupling may be configured to connect the connecting piece releasably to the drive nut. By providing a connecting piece, it is possible to increase further the number of situations for which an anti-trapping protection may be provided.

The capsule carrier may have a first guide rail which is fastened to the capsule carrier and which extends parallel to the threaded spindle and on which the connecting piece is movably mounted. Moreover, the drive nut may have a second guide rail which is fastened to the drive nut and which extends parallel to the threaded spindle and on which the connecting piece is movably mounted. Thus a reliable release and closure of the couplings may be permitted.

According to a further aspect of the invention a (further) beverage system for making a beverage based on ingredients in a capsule is described. The aspects described in this document also apply to this beverage system (in particular the aspects relative to the one or more releasable couplings).

The beverage system comprises a conveying carriage having a capsule carrier for receiving a capsule, wherein the conveying carriage may be moved on a housing wall of the beverage system together with the capsule carrier out of the housing of the beverage system or into the housing. Moreover, the beverage system substantially comprises a threaded spindle extending inside the housing perpendicular to the housing wall and having a drive nut which is connected to the capsule carrier. Moreover, the beverage system comprises a motor which is designed to rotate the threaded spindle in order to move the capsule carrier along the threaded spindle into the housing or out of the housing.

The beverage system further comprises one or more releasable couplings which are configured to separate the capsule carrier from the conveying carriage and/or to separate the capsule carrier from the drive nut when the movement of the conveying carriage and/or the capsule carrier is hindered by an object. Thus a system having anti-trapping protection may be provided in an efficient manner.

It should be noted that any aspects of the systems described in this document may be combined together in a variety of ways. In particular, the features of the claims may be combined together in a variety of ways.

BRIEF DESCRIPTION OF THE FIGURES

The invention is described in more detail hereinafter with reference to the exemplary embodiments shown in the accompanying drawing, in which.

DETAILED DESCRIPTION OF THE INVENTION

As already set forth above, the present document relates to making a beverage based on ingredients in a capsule in a convenient, safe and cost-efficient manner.

Figure 1A:
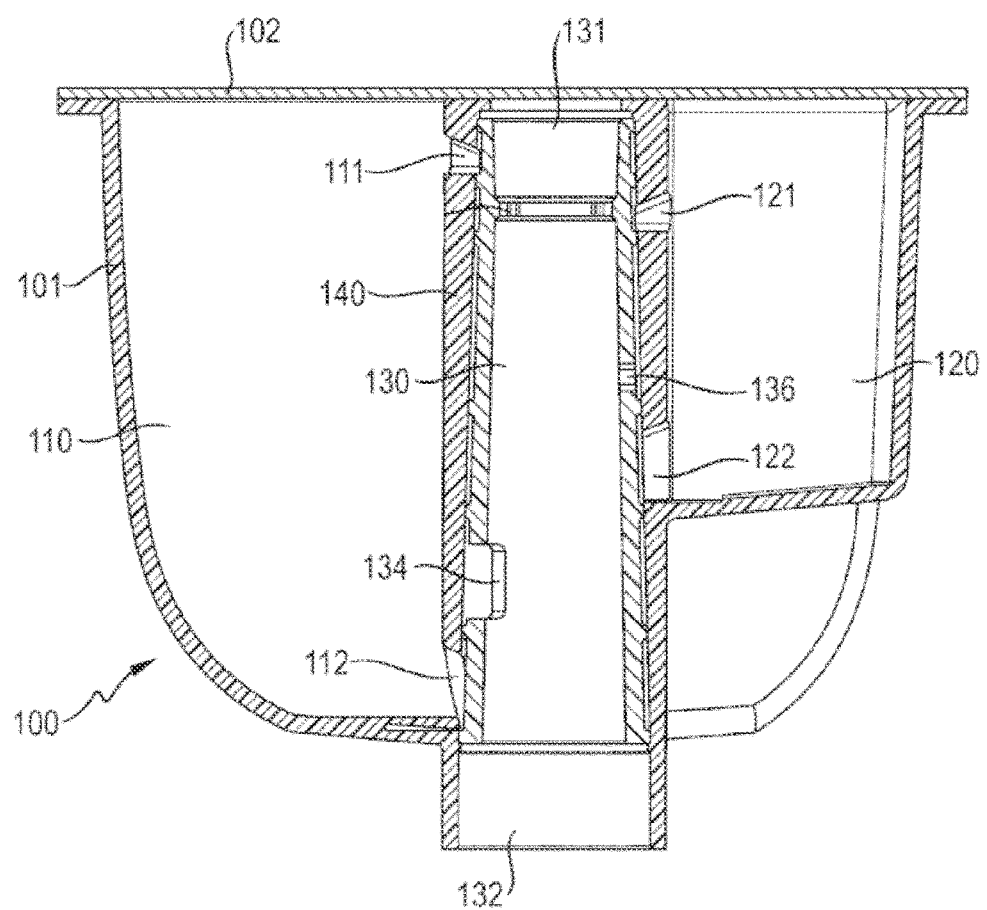
FIG. 1a shows a sectional view through a capsule with a valve in a closed state.

FIG. 1a shows an exemplary capsule, in particular an exemplary multi-chamber capsule 100. The capsule 100 shown in FIG. 1a comprises two chambers 110, 120, wherein the chambers 110, 120 are formed by separate shells or, respectively, receptacles. The chambers 110, 120 may be used to store different ingredients separately from one another. By the provision of a plurality of chambers 110, 120 for different ingredients, the shelf life of the ingredients in a capsule 100 may be increased.

The capsule 100 may be used in a beverage system or, respectively, beverage vending machine for making mixed beverages. In this case alcohol-containing and/or non-alcoholic beverages may be made. A portion of a beverage may be made by combining the ingredients (for example liquids) stored inside a capsule 100 with a liquid flow provided by the beverage system. In this case a contamination of the beverage system by ingredients from a capsule 100 is intended to be avoided as far as possible in order to be able to use the beverage system in an efficient and convenient manner for making a plurality of portions, optionally of different beverage types.

The capsule 100 shown in FIG. 1a comprises a capsule body 101 by which the one or more chambers 110, 120 of the capsule 100 are formed. The capsule body 101 may be covered by a lid 102, wherein the lid 102 may be formed by a sealing film. Moreover, the capsule 100 comprises a valve 130, 140, wherein the valve 130, 140 comprises a valve housing 140, (generally also denoted as the chamber wall) in which a closure part 130 is arranged. The valve housing 140 may be part of the capsule body 101 and may form at least partially the one or more chambers 110, 120. In particular, in each case the valve housing 140 may form at least one wall of the one or more chambers 110, 120. The closure part 130 may be moved inside the valve housing 140 in order to open or, respectively, close the valve 130, 140.

In the example shown in FIG. 1a, the valve housing 140 encloses a (circular) cylindrical space in which the closure part 130 may be moved in a translatory manner in order to open or, respectively, close the valve 130, 140. In particular, the valve 130, 140 may be opened when the closure part 130 is moved downwardly and closed when the closure part 130 is moved upwardly.

The valve housing 140 has in an upper region or, respectively, in the vicinity of an upper face of the capsule 100 a first inlet opening 111 for the first chamber 110 and a second inlet opening 121 for the second chamber 120. An inlet opening 111, 112 may be used to supply a chamber 110, 120 with a flushing medium in order to flush out the ingredients from the chamber 110, 120. Alternatively or additionally, an inlet opening 112, 112 may be used to ventilate a chamber 110, 120, in order to permit the ingredients to run out of a chamber 110, 120 (optionally solely brought about by gravitational force).

Moreover, the valve housing 140 has in a lower region or, respectively, in the vicinity of a lower face of the capsule 100 a first outflow opening 112 for the first chamber 110 and a second outlet opening 122 for the second chamber 120. The ingredients of a chamber 110, 120 may run out of the chamber 110, 120 via an outlet opening 112, 112.

In a closed state of the valve 130, 140 the closure part 130 may be configured to close the openings 111, 112, 121, 122 of the one or more chambers 110, 120. On the other hand, the openings 111, 112, 121, 122 may be opened by a movement of the closure part 130 so that the ingredients may run out of the one or more chambers 110, 120 (optionally by using a flushing medium which may be supplied to the one or more chambers 110, 120 via the one or more inlet openings 112, 112). To this end, the closure part 130 may have a first through-hole 134 for opening the first chamber 110 and optionally a second through-hole 136 for opening the second chamber 120. The one or more through-holes 134, 136 (of the closure part wall) of the closure part 130 may be brought in front of the outlet openings 112, 122 of the valve housing 140 by a movement of the closure part 130 so that one or more outlet channels of the one or more chambers 110, 120 are provided by the outlet openings 112, 122 and through-holes 134, 136 into a channel-shaped cavity of the closure part 130.

The closure part 130 may have a (cylindrical or respectively channel-shaped) cavity, which extends from an upper end 131 of the closure part 130 to a lower end 132 of the closure part 130. The cavity in this case is enclosed by the closure part wall of the closure part 130, wherein the through-holes 134, 136 are formed by through-holes in the closure part wall of the closure part 130. The cavity of the closure part 130 may be positioned within a beverage system over a container for a beverage, such that the ingredients flowing out of a chamber 110, 120 may flow directly from the channel-shaped cavity into the container without coming into contact with a component of the beverage system. Thus contamination of a beverage system may be avoided in an efficient and reliable manner.

Figure 1B:
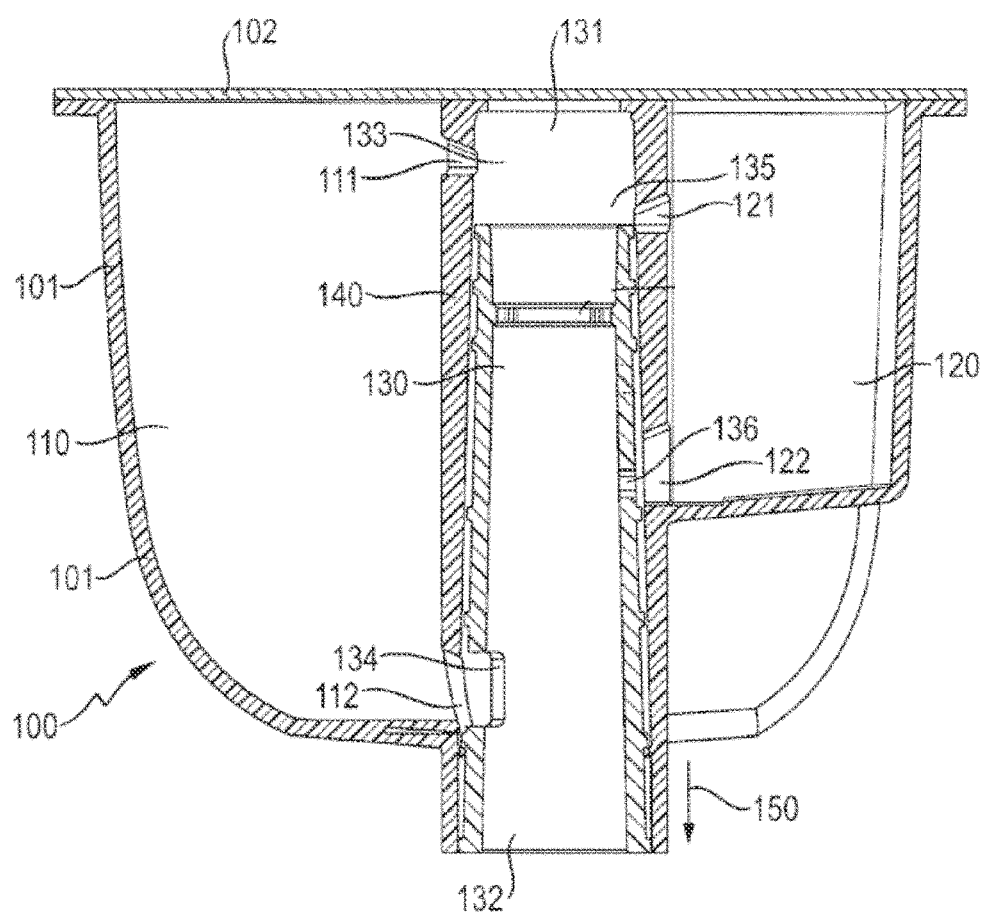
FIG. 1b shows a sectional view of the capsule of FIG. 1a with a valve in an open state.

FIG. 1*b* shows the capsule 100 of FIG. 1*a* in an open state. In particular FIG. 1*b* shows how a through-hole 134, 136 of the closure part 130 may be moved in front of an outlet opening 112, 122 of a chamber 110, 120 by a movement 150 of the closure part 130. FIG. 1*b* also shows how a passage 133, 135 of the closure part 130 may be moved in front of the inlet opening 111, 121 of a chamber 110, 120. Thus it may be brought about that the ingredients of one or more chambers 110, 120 may flow out of the capsule 100 via the channel-shaped cavity of the closure part 130. Optionally a flushing medium may be passed into the chamber 110, 120 via a through-hole 133, 135 of the closure part 130 and via an inlet opening 111, 121 of a chamber 110, 120 in order to flush out the ingredients from the chamber 110, 120.

Figure 2:
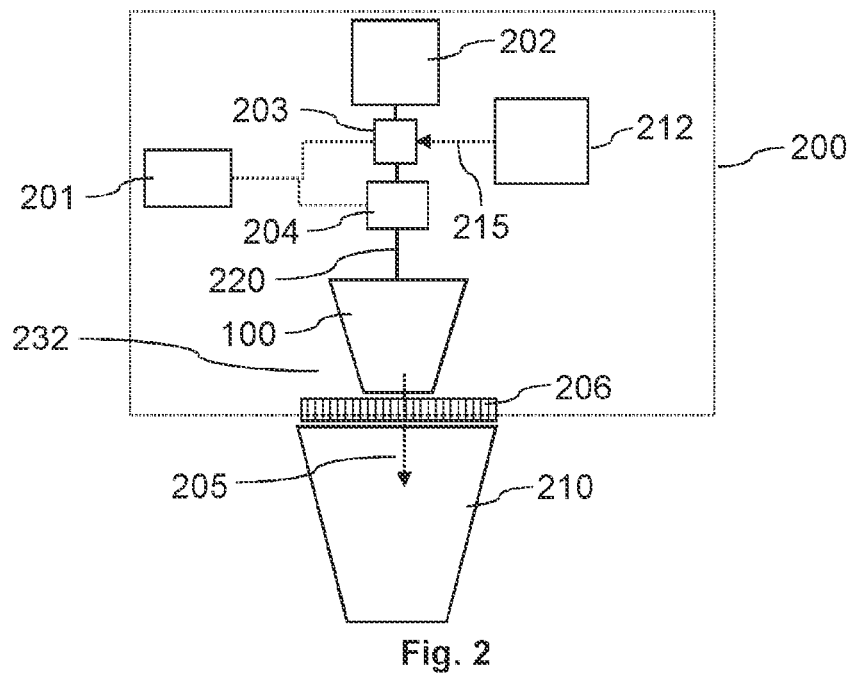
FIG. 2 shows a block diagram of an exemplary beverage system.

FIG. 2 shows a block diagram of an exemplary capsule system or, respectively, beverage system 200. The beverage system 200 comprises a control unit 201 which is designed to control the production process (of a portion) of a beverage. A capsule 100 may be transferred by a user to the system 200 (into a capsule receiver of the system 200 provided therefor). The capsule may then be transferred via a conveying means (for example via a conveying carriage) to a processing position 232 in the interior of a housing of the capsule system 200.

The conveying means may be activated by the user (for example by actuating a knob or by directly inserting the capsule 100). When the capsule 100 arrives at the processing position 232 then the production process may be started.

During the course of the production process the control unit 201 causes an opening means 220 for opening the capsule 100 (for example a (hollow) needle or, respectively, lance) to be guided toward the capsule 100. To this end, it is possible to actuate an actuator 204 which guides the opening means 220 toward the capsule 100 in order to open the capsule 100. Moreover, a further actuator 203 may be activated in order to force a flushing medium (for example water from a container 202 of the system 200) into the capsule 100 in order to flush out at least one chamber 110, 120 in the capsule 100. By opening the capsule 100 and optionally by flushing out one or more chambers 110, 120 of the capsule 100, the ingredients of the one or more chambers 110, 120 may flow out of the capsule 100. A receptacle 210 in which the beverage to be created is provided to the user may be positioned below a dispensing unit 206 of the system 200.

The system 200 may be configured such that a mixture of ingredients 205 (which comprises the ingredients and optionally a flushing medium and/or one or more other liquids) flow out of the one or more chambers 110, 120 of the capsule 100 directly via the dispensing unit 206 into the receptacle 210.

The system 200 may also be designed to fill further one or more liquids 215 (for example from a container 212) into the cup 210 for the beverage to be created. The liquid 215 may comprise, for example, alcohol. In this case, the liquid 215 may be transferred through the channel-shaped cavity 138 of the valve 130, 140 of a capsule 100 into the receptacle 210. Thus a reliable mixing of a beverage may be brought about.

A mixed beverage may be made in a reliable manner by means of the capsule system or, respectively, the beverage system 200 shown in FIG. 2 without contaminating the capsule system or, respectively, beverage system 200 at the same time.

Figure 3A:
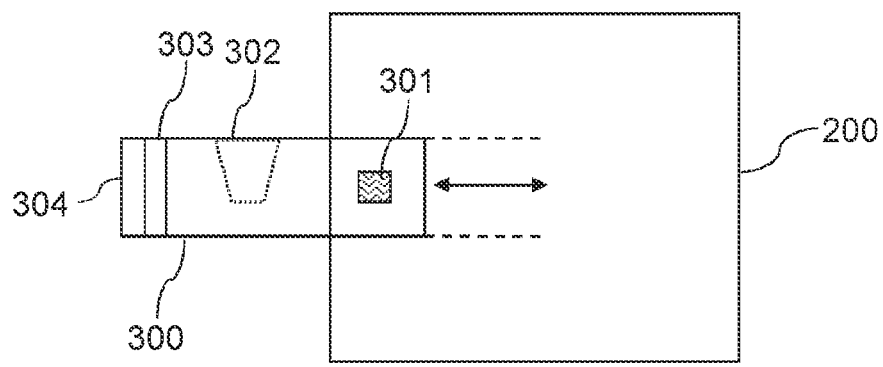
FIG. 3a shows a side view of an exemplary conveying carriage for a capsule in the extended state.
Figure 3B:
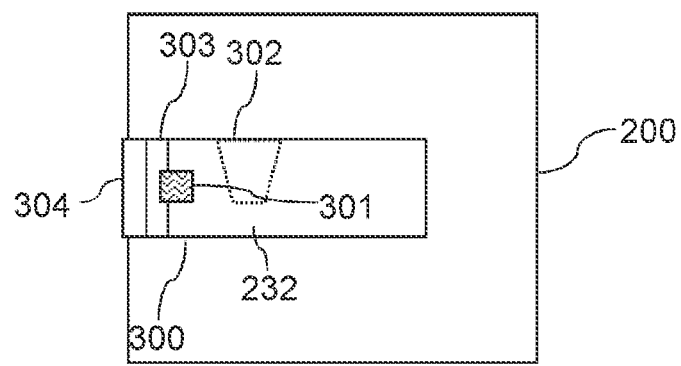
FIG. 3b shows a side view of an exemplary conveying carriage for a capsule in the retracted state.

FIG. 3*a* shows a conveying carriage 300 as an exemplary conveying means in a side view. The conveying carriage 300 comprises a capsule receiver 302 in the form of a recess into which a capsule 100 may be placed by a user (similar to a CD in an extended CD drive). The conveying carriage 300, for example in response to an input by a user, may be moved into the interior of the system 200 by an actuator 301 (for example by an electric motor) in order to convey the capsule 100 to the processing position 232. FIG. 3*b* shows the conveying carriage 300 in a retracted state.

Figure 3C:
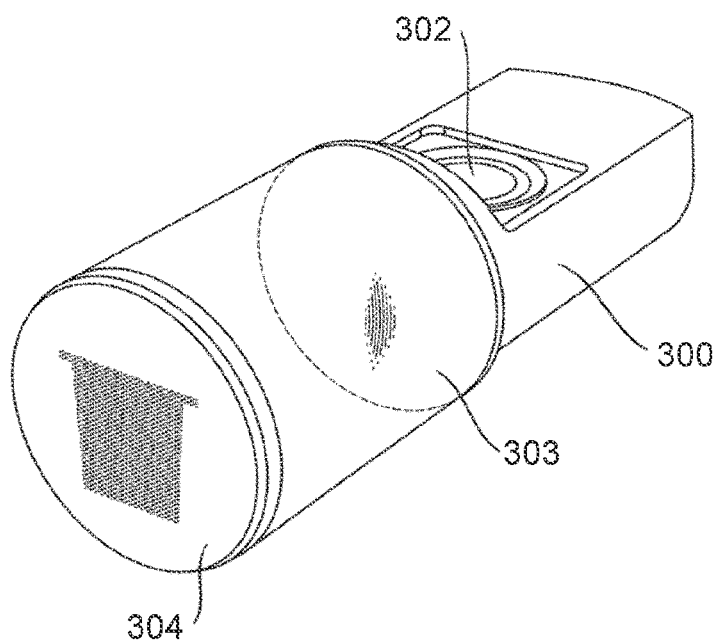
FIG. 3c shows a perspective view of an exemplary conveying carriage.

The front face or, respectively, carriage front 303 of the conveying carriage 300 may comprise an illuminating region (as shown amongst other things in FIG. 3*c*) which may be optionally illuminated in different colors. Via the illuminating region, for example, a state of the system 200 may be communicated to a user. Alternatively or additionally, information relative to the beverage which has been made may be displayed to the user (for example by a specific color coding). The carriage front 303 of the conveying carriage 300 may also have a cover region 304 which may be optionally used for detecting an input of a user (for example by touch).

Similar to a CD drawer, the conveying carriage 300 may be extended out of the system 200 and thereby releases an insertion option (i.e. the capsule receiver 302) for a beverage capsule 100. A user may place a capsule 100 into the capsule receiver 302 and the conveying carriage 300, loaded with the capsule 100, may then be retracted into the system 200 and then the process for creating a beverage may be started immediately.

FIGS. 4a to 4g show further details of a conveying carriage 300 in a view from above. The conveying carriage 300 bears a capsule carrier 402 in or, respectively, on which the capsule receiver 302 is arranged. The capsule carrier 402 may be positioned, for example, on carrier rails 410 of the conveying carriage 300. In particular, the conveying carriage 300 may have a carriage front 303 which runs parallel to the housing front 401 of the housing of the system 200. Two or more carrier rails 410 which extend substantially perpendicular from the carriage front 303 into the interior of the housing of the system 200 may be arranged on the carriage front 303. It is possible that the (rectangular) capsule carrier 402 is to be positioned or, respectively, is positioned on the carrier rails 410 of the conveying carriage 300. The capsule carrier 402 (as shown in FIGS. 5a to 5e) may be connected via one or more releasable (optionally magnetic and/or spring-loaded) couplings to the conveying carriage 300.

The capsule carrier 402 is connected (optionally via one or more releasable couplings) to a drive 403, 404, 301 for the capsule carrier 402 and for the conveying carriage 300. A translatory movement of the conveying carriage 300 with the capsule carrier 402 between the extended state and the retracted state (in particular out of the housing of the system 200 or into the housing of the system 200) is brought about by the drive 403, 404, 301.

Figure 4A:
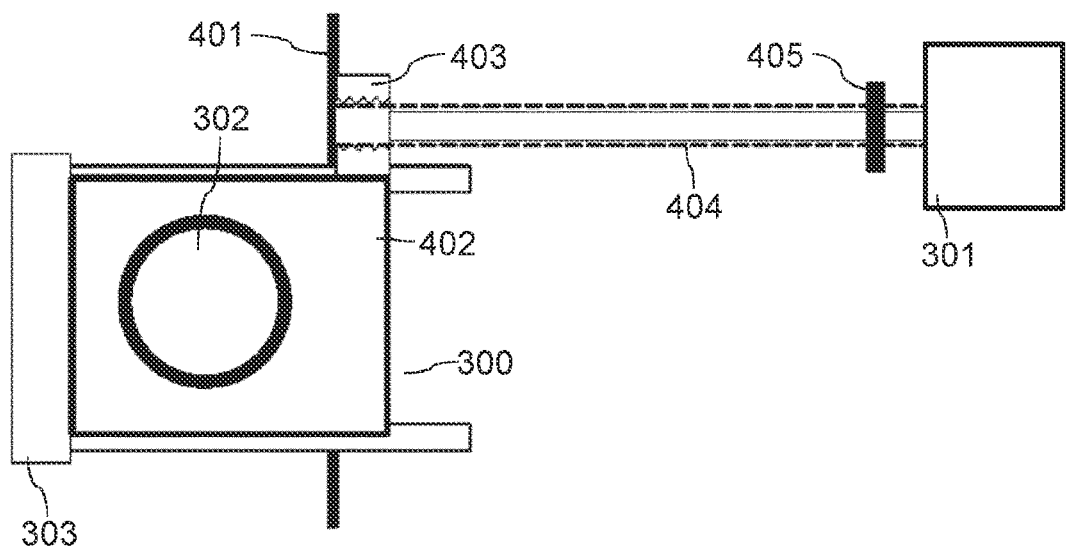
FIG. 4a shows a view from above of an exemplary conveying carriage in the extended state.
Figure 4B:
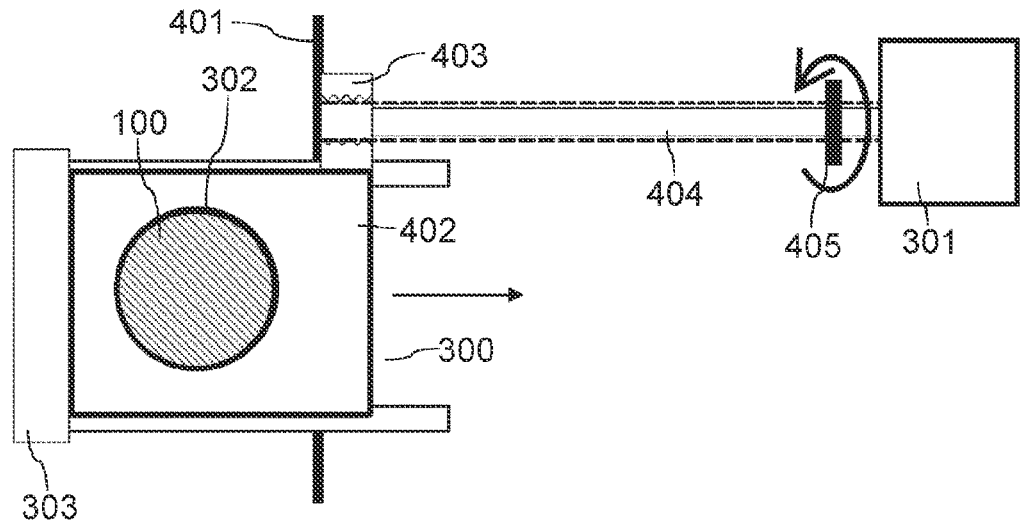
FIG. 4b shows the conveying carriage of FIG. 4a with an inserted capsule.
Figure 4C:
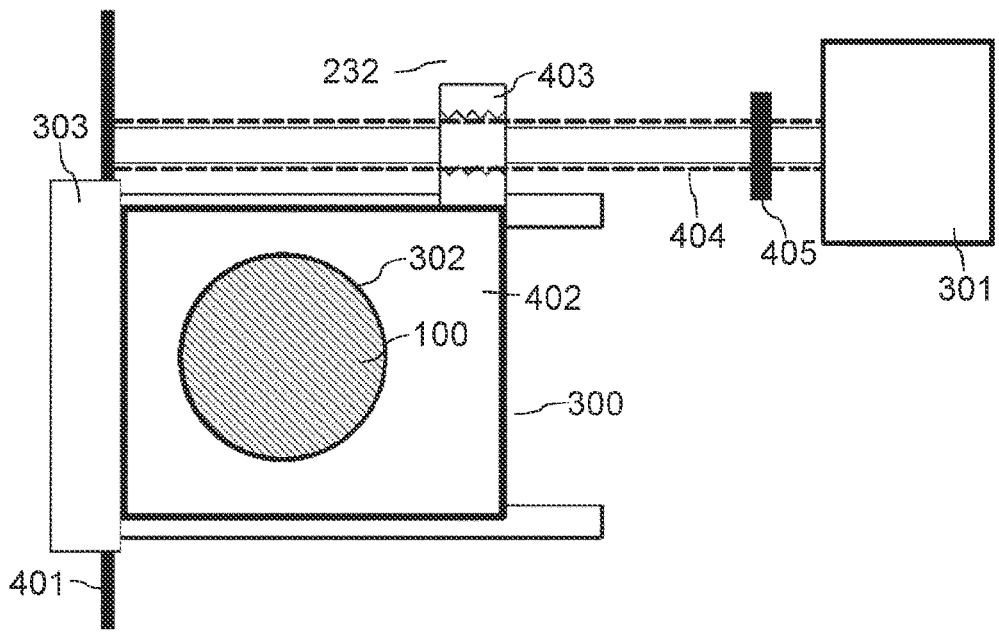
FIG. 4c shows the conveying carriage of FIG. 4a in the retracted state.

The drive 403, 404, 301 comprises a drive nut 403 to which the capsule carrier 402 is fastened. The drive nut 403 is mounted on a threaded spindle 404, wherein the threaded spindle 404 is driven by an actuator 301 (for example an electric motor), in particular rotated, so that a translatory movement of the drive nut 403 is brought about along the threaded spindle 404. FIG. 4a shows the conveying carriage 303 with the capsule carrier 402 in the extended state. The rotation of the threaded spindle 404 into a first direction of rotation (see FIG. 4b) may cause the capsule carrier 402 together with the conveying carriage 300 to be pulled into the interior of the housing of the system 200 as far as the retracted state into the processing position 232 (see FIG. 4c). In the retracted state of the carriage 300 the carriage front 303 is arranged on the housing front 401 (and closes the opening in the housing front 401). Moreover, when the capsule 100 is located at the processing position 232, a mixed beverage may be made based on ingredients in the capsule 100 placed into the capsule carrier 402.

Figure 4D:
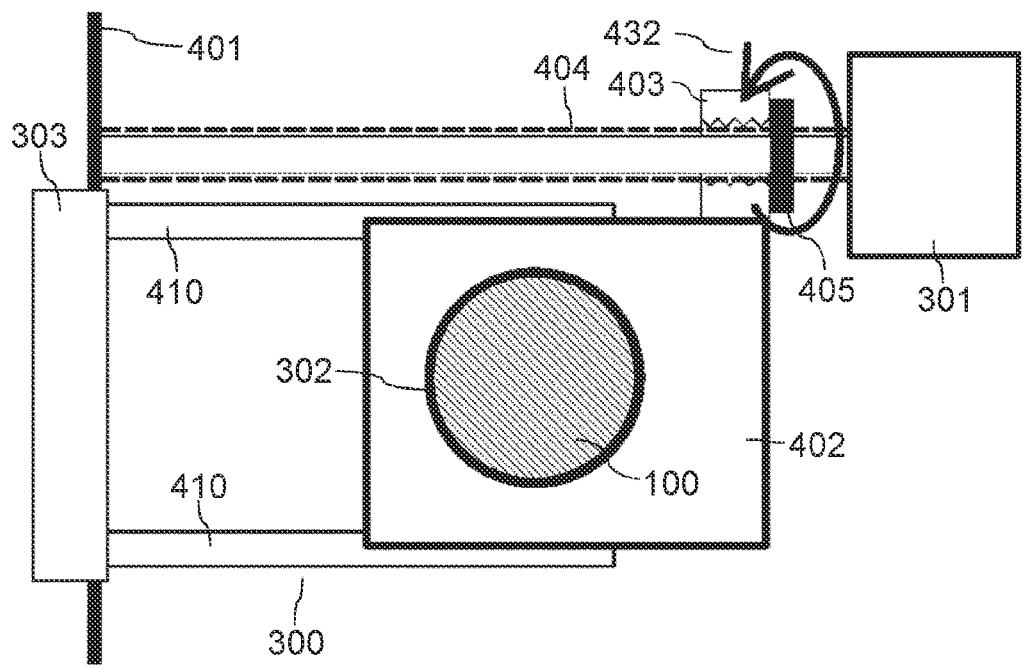
FIG. 4d shows the conveying carriage of FIG. 4a at an ejection position for the capsule.
Figure 4E:
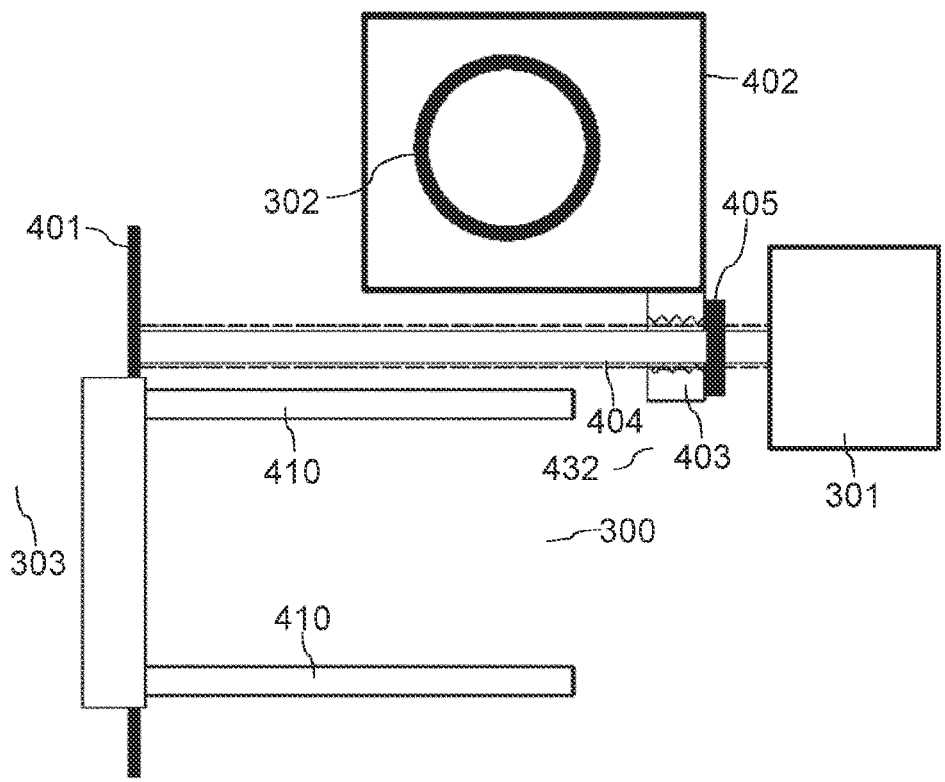
FIG. 4e shows the conveying carriage of FIG. 4a with a tilted carrier for ejecting a capsule.
Figure 4F:
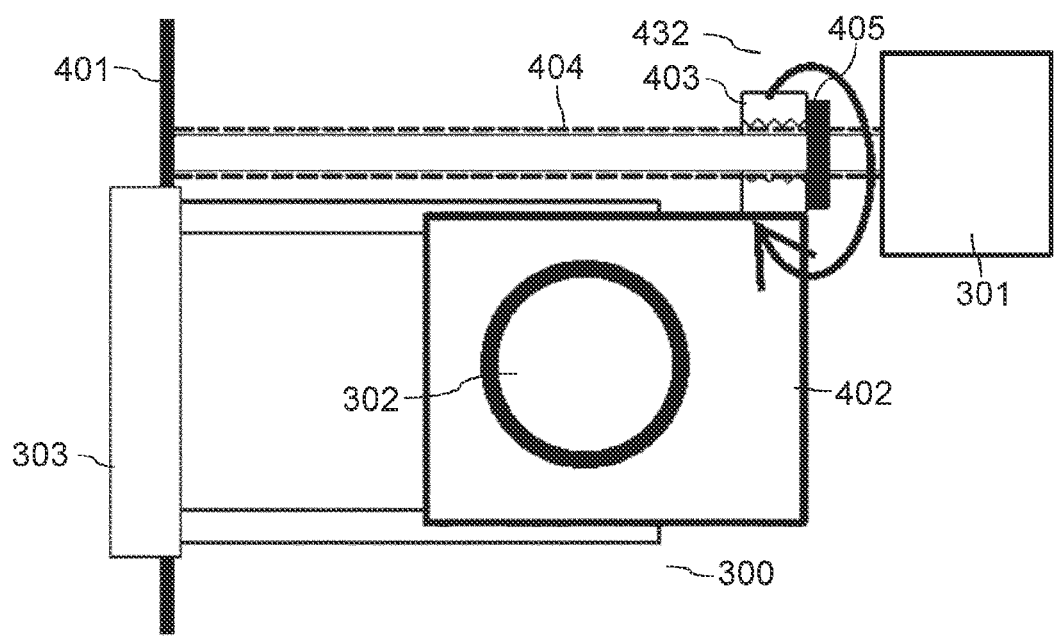
FIG. 4f shows the conveying carriage of FIG. 4a at the ejection position after the ejection of a capsule.

After the production process, the threaded spindle 404 may be rotated further in the first direction of rotation in order to convey the capsule carrier 402 without the conveying carriage 300 further into an ejection position 432 (see FIG. 4d). The capsule carrier 402 in this case may slide on the carrier rails 410 of the (stationary) conveying carriage 300.

When the ejection position 432 is reached, the drive nut 403 abuts against a stop element 405 arranged on the or, respectively, around the threaded spindle 404. The stop element 405 may, for example, be fixedly fastened to the threaded spindle 404 and rotate with the threaded spindle 404. Alternatively, the stop element 405 may be fastened, for example, to the actuator 301 (by fastening elements, not shown) and may be supported against the actuator 301.

The stop element 405 is configured to block the translatory movement of the drive nut 403 in the first direction of translation (into the interior of the housing of the system 200). As a result, the drive nut 403 is rotated by a rotation of the threaded spindle 404 in the first direction of rotation with the threaded spindle 404 (for example due to the friction on the stop element 405). This leads to the capsule carrier 403 being lifted from the carrier rails 410 of the conveying carriage 300 and rotated around the threaded spindle 404 (see FIG. 4e). In this case a rotation of ca. 180° may take place, so that the capsule carrier 402 is reversed and as a result the used capsule 100 is ejected from the capsule carrier 402.

After the ejection of the capsule 100 the threaded spindle 404 may be rotated into the opposing second direction of rotation (see FIG. 4f) in order to rotate the empty capsule carrier 402 back and to deposit it on the conveying carriage 300. Moreover, by further rotation of the threaded spindle 404 in the second direction of rotation, the capsule carrier 402 may be conveyed back into the processing position 232.

Figure 4G:
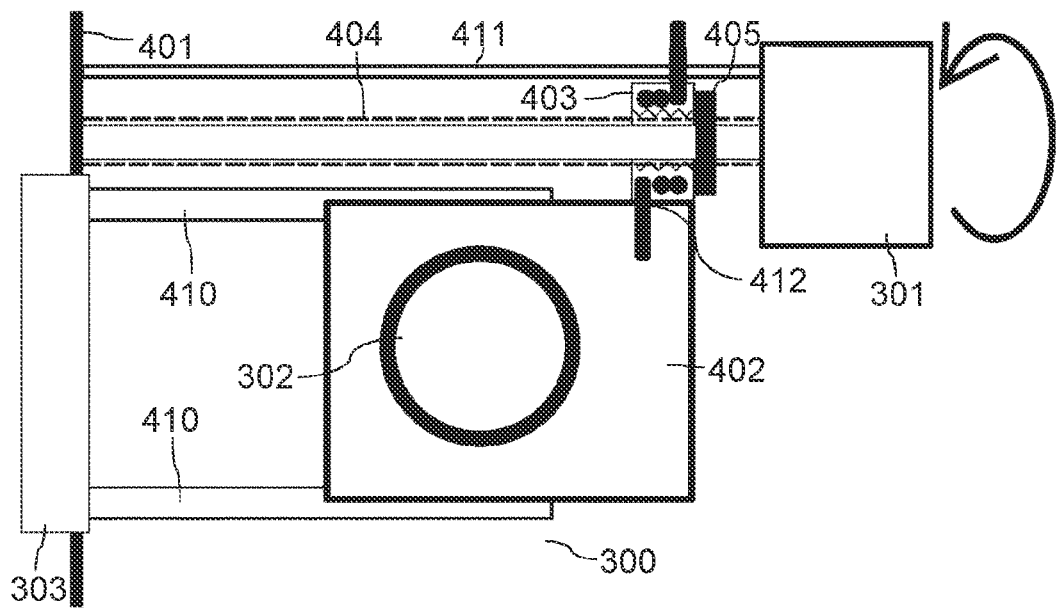
FIG. 4g shows the conveying carriage of FIG. 4a with a torsion spring for the tilting process of the capsule carrier.

FIG. 4g shows a torsion spring 412 which is supported against a support rail 411 running parallel to the threaded spindle 404 and which is configured to push the capsule carrier 402 against the carrier rails 410 of the conveying carriage 300. The torsion spring 412 may be arranged in or on the drive nut 403. The torsion spring 412 may bring about a stable movement of the capsule carrier 402 on the carrier rails 410 of the conveying carriage 300 and/or with the conveying carriage 300. Moreover, the torsion spring 412 may reliably cause the capsule carrier 402 to rotate back to the carrier rails 410 of the conveying carriage 300 after the ejection of a capsule 100.

By means of the drive 403, 404, 405, shown in FIGS. 4a to 4g, of the conveying carriage 300 and/or of the capsule carrier 402, (in particular by using a single actuator 301) both a translatory movement of the capsule 100 (for positioning the capsule 100 for making a mixed beverage) and a rotational movement of the capsule 100 (for ejecting the capsule 100) is permitted in an efficient manner.

FIGS. 5a to 5e show exemplary releasable couplings or, respectively, coupling elements 502, 512, 522 with which the capsule carrier 402 is fastened to the conveying carriage 300 and/or with which the capsule carrier 402 is fastened to the drive nut 403. In particular, FIGS. 5a to 5e show a first coupling 502 with which the capsule carrier 402 is fastened to the carriage front 303. Moreover, FIGS. 5a to 5e show a second coupling 512 with which the capsule carrier 402 is fastened to a connecting piece 503, as well as a third coupling 522 with which the connecting piece 503 is fastened to the drive nut 403. The couplings 502, 512, 522 may be respectively magnetic and/or spring-mounted couplings.

The capsule carrier 402 may have a first guide rail 504 and the drive nut 403 may have a second guide rail 505 which run in each case parallel to the threaded spindle 404 and extend into the interior of the housing of the system 200. The connecting piece 503 may be movably mounted on the guide rails 504, 505.

Figure 5A:
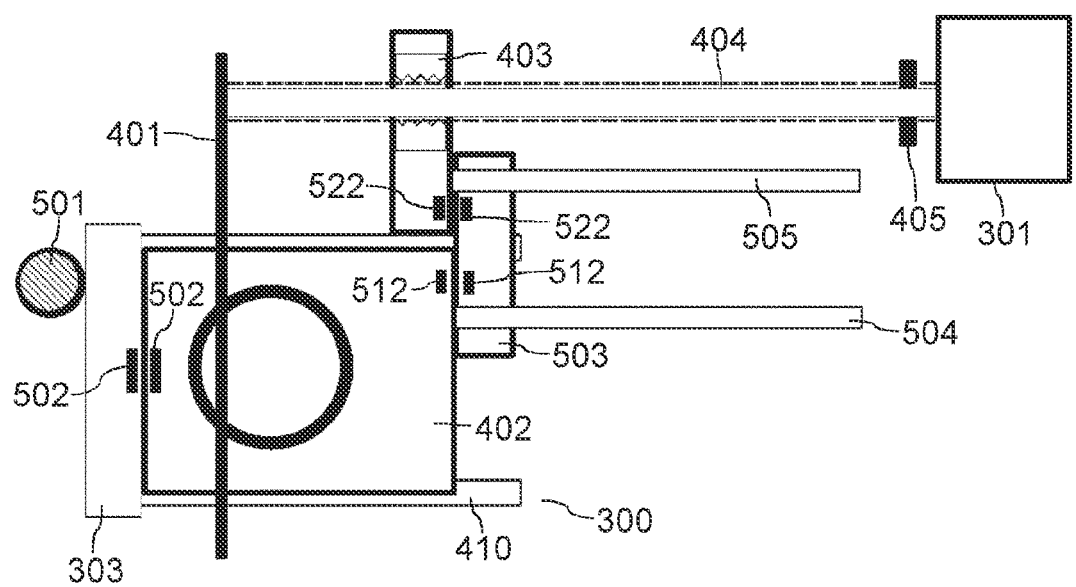
FIG. 5a shows exemplary releasable couplings between the conveying carriage, the capsule carrier and the drive of the conveying carriage.
Figure 5B:
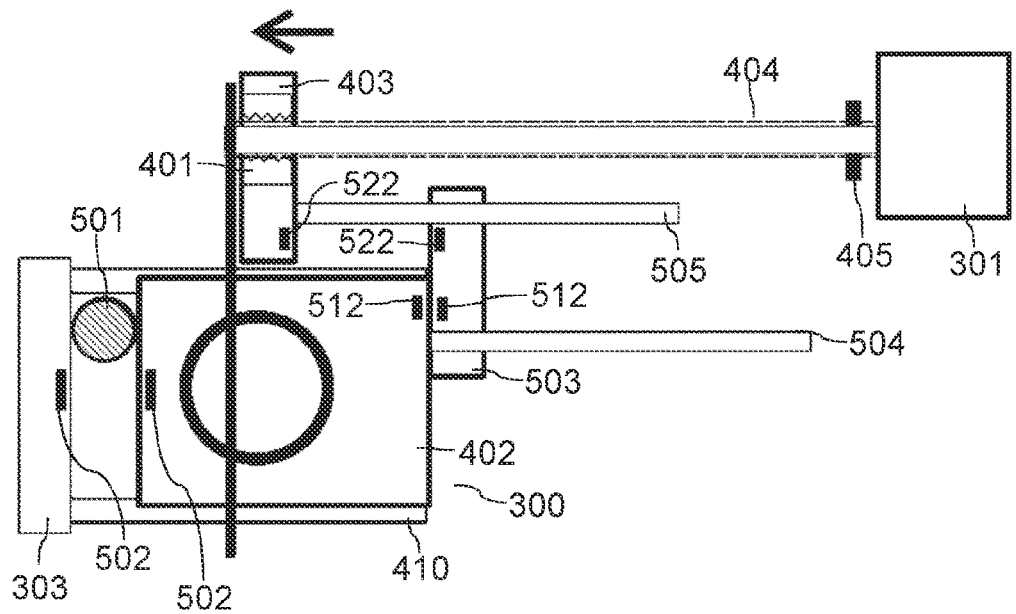
FIG. 5b shows released couplings when placing an object between the carriage front and the capsule carrier.

The releasable couplings 502, 512, 522 may be used to provide an anti-trapping protection of the system 200. FIG. 5b shows a situation in which the conveying carriage 300 is conveyed out of the housing of the system 200 (shown by the arrow) and in which an object 501 (for example the finger of a user) is located between the carriage front 303 and the capsule carrier 402. As may be seen in FIG. 5b, releasing the first coupling 502 and the third coupling 522 (by the force of the actuator 301) may cause the drive nut 403 to be able to move further along the threaded spindle 404 without trapping the object 501.

Figure 5C:
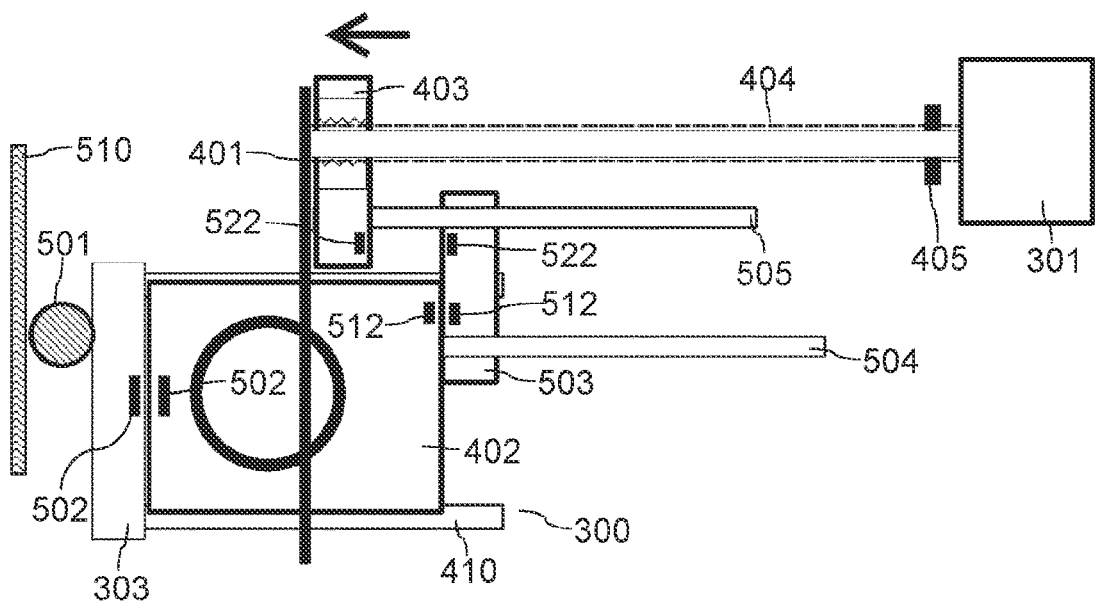
FIG. 5c shows a released coupling when placing an object in front of the carriage front.

FIG. 5c shows a situation in which an object 501 is arranged between the carriage front 303 and a wall 510. A trapping of the object 501 due to the translatory movement of the drive nut 403 may be avoided by releasing the third coupling 522.

Figure 5D:
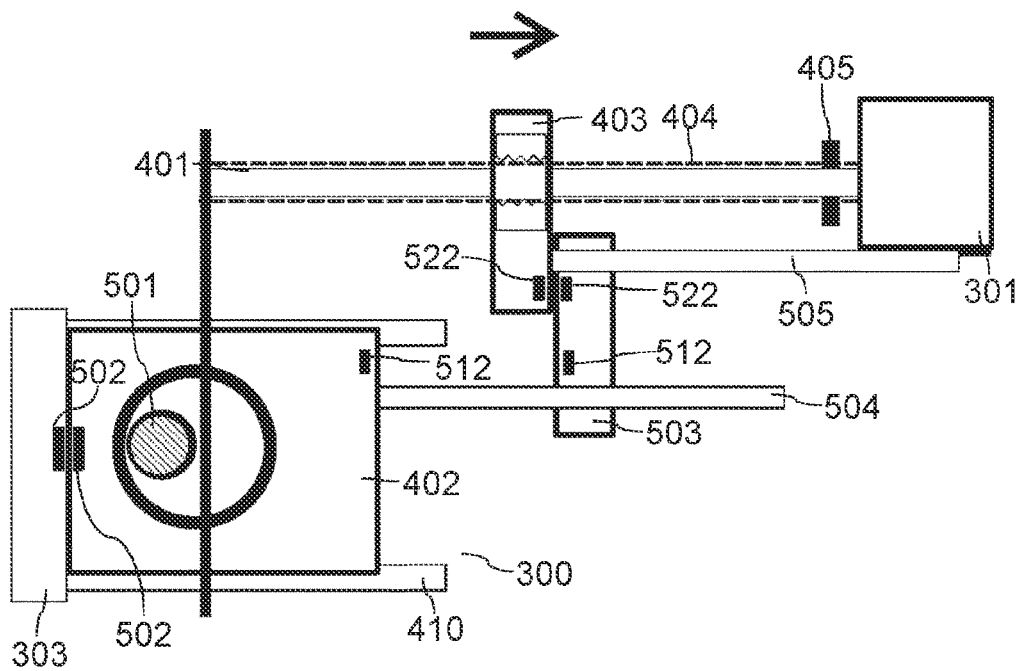
FIG. 5d shows a released coupling when placing an object in the capsule receiver.

FIG. 5*d* shows a situation in which an object 501 is arranged in the capsule receiver 302 of the capsule carrier 402, whilst the capsule carrier 402 is pulled into the interior of the housing of the system 200. A trapping of the object 501 may be avoided by releasing the second coupling 512.

Figure 5E:
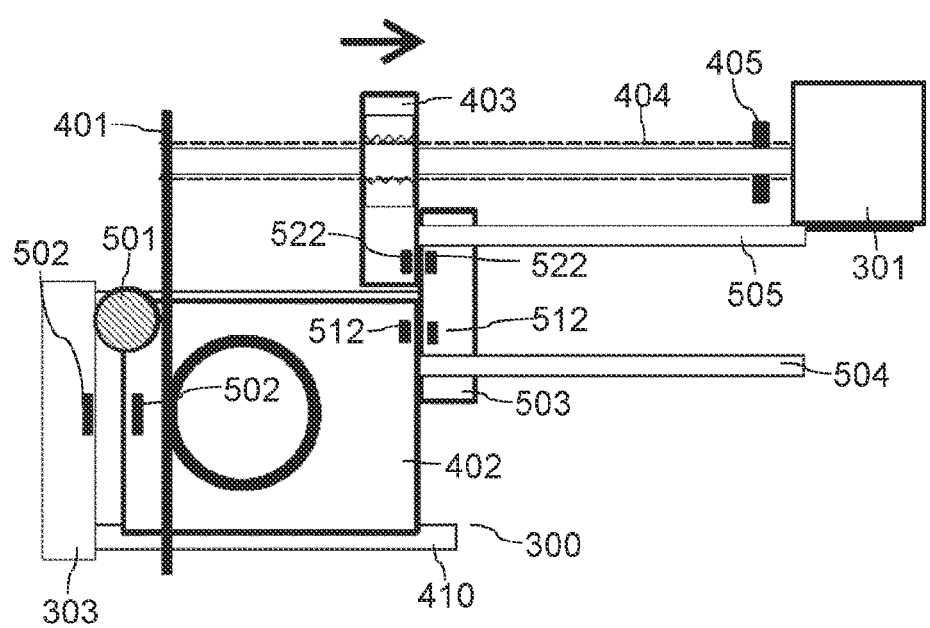
FIG. 5e shows a released coupling when placing an object between the carriage front and the front of the beverage system.

FIG. 5*e* shows a situation in which an object 501 is arranged between the carriage front 303 and the housing front 401, whilst the capsule carrier 402 is pulled into the interior of the housing of the system 200. A trapping of the object 501 may be avoided by releasing the first coupling 502.

By providing releasable couplings 502, 512, 522, therefore, an efficient and reliable anti-trapping protection may be provided.

The present invention is not limited to the exemplary embodiments shown. In particular, it should be noted that the description and the figures are only intended to illustrate the principle of the proposed system.

The invention claimed is:

1. A beverage system for making a beverage based on ingredients in a capsule, the beverage system comprising:
   a conveying carriage having a capsule carrier for receiving the capsule, said conveying carriage being movable on a housing wall of the beverage system together with said capsule carrier out of a housing of the beverage system or into the housing of the beverage system;
   a threaded spindle extending inside the housing of the beverage system the housing perpendicular to the housing wall, and a drive nut connected to said capsule carrier;
   a stop element disposed on said threaded spindle at an ejection position, said stop element being disposed to block a movement of said drive nut along said threaded spindle; and
   a motor configured to rotate the threaded spindle in a first direction of rotation, in order to:
      move said capsule carrier along said threaded spindle into the housing of the beverage system to a processing position at which the beverage is made based on the ingredients in the capsule placed in said capsule carrier;
      move said capsule carrier further along said threaded spindle to the ejection position; and
      rotate said capsule carrier at the ejection position about said threaded spindle to eject the capsule from said capsule carrier.

2. The beverage system according to claim 1, wherein said conveying carriage has a carriage front which is configured to close an opening in the housing wall for said conveying carriage and for said capsule carrier when said conveying carriage is located with said capsule carrier at the processing position.

3. The beverage system according to claim 2, wherein:
   said conveying carriage comprises at least two carrier rails configured to bear said capsule carrier; and
   said conveying carriage is releasably connected via one or more releasable couplings to said capsule carrier.

4. The beverage system according to claim 3, wherein said releasable couplings are magnetic and/or spring-mounted couplings.

5. The beverage system according to claim 1, wherein:
   said conveying carriage and said capsule carrier are moved together along said threaded spindle between an extended state of said conveying carriage and the processing position; and
   said capsule carrier is moved along said threaded spindle without said conveying carriage between the processing position and the ejection position.

6. The beverage system according to claim 1, further comprising a torsion spring configured to push said capsule carrier onto said conveying carriage.

7. The beverage system according to claim 6, wherein:
   the beverage system comprises a support rail running along said threaded spindle; and
   said torsion spring is configured to be supported on said support rail in order to push said capsule carrier onto said conveying carriage along an entire distance between an extended state of said conveying carriage and the ejection position.

8. The beverage system according to claim 1, wherein said motor is configured to rotate said threaded spindle in a second direction of rotation to rotate said capsule carrier back around said threaded spindle onto said conveying carriage.

9. The beverage system according to claim 1, wherein:
   said motor is configured to rotate the threaded spindle in a second direction of rotation,
      to move said capsule carrier along said threaded spindle from the ejection position to the processing position; and
      to move said capsule carrier and said conveying carriage along said threaded spindle from the processing position further into an extended state of said conveying carriage out of the housing.

10. The beverage system according to claim 1, wherein:
    said capsule carrier is rotated from a first side of said threaded spindle to an opposing second side of said threaded spindle for ejecting the capsule; and
    the beverage system further comprises a collection container for receiving the capsule at the ejection position on the second side of the threaded spindle.

11. The beverage system according to claim 10, wherein said capsule carrier is rotated from the first side of said threaded spindle to the opposing second side by an angle of between 160° and 200°.

12. The beverage system according to claim 1, wherein:
    said capsule carrier is fastened to a carriage front of said conveying carriage by way of a releasable first coupling; and
    said first coupling is configured to be released when an object is trapped between said carriage front and said housing wall, while said capsule carrier is moved by said motor into the housing.

13. The beverage system according to claim 12, wherein:
    said capsule carrier is fastened to said drive nut by way of a second coupling;
    said capsule carrier includes a capsule receiver for receiving the capsule; and
    said second coupling is configured to release when the object, which is disposed in said capsule receiver and which protrudes over said capsule receiver, is pushed against said housing wall, while the capsule carrier is moved by said motor into said housing.

14. The beverage system according to claim 13, wherein:
    said capsule carrier is fastened to said drive nut by way of a third coupling; and
    said third coupling is configured to release when a carriage front of said conveying carriage is pushed against the object, while the capsule carrier is moved with said conveying carriage by said motor out of the housing.

15. The beverage system according to claim 14, wherein:
said capsule carrier is connected to said drive nut via a connecting piece;
said second coupling is configured to releasably connect said capsule carrier to said connecting piece; and
said third coupling is configured to releasably connect said connecting piece to said drive nut.

16. The beverage system according to claim 15, wherein
the capsule carrier has a first guide rail which extends parallel to the threaded spindle and on which the connecting piece is movably mounted; and
the drive nut has a second guide rail which extends parallel to the threaded spindle and on which the connecting piece is movably mounted.

17. The beverage system according to claim 1, wherein:
said capsule carrier is fastened to said drive nut by way of a coupling;
said capsule carrier includes a capsule receiver for receiving a capsule; and
said coupling is configured to release when an object, which is disposed in said capsule receiver and which protrudes over said capsule receiver, is pushed against said housing wall, while the capsule carrier is moved by said motor into said housing.

18. The beverage system according to claim 1, wherein:
said capsule carrier is fastened to said drive nut by way of a coupling; and
said coupling is configured to release when a carriage front of said conveying carriage is pushed against an object, while the capsule carrier is moved with said conveying carriage by said motor out of the housing.

* * * * *